(12) United States Patent
Clapper et al.

(10) Patent No.: US 11,098,832 B2
(45) Date of Patent: Aug. 24, 2021

(54) SYSTEM, METHOD AND APPARATUS FOR LOW PROFILE SEAL

(71) Applicant: NORTH AMERICAN PIPE CORPORATION, Houston, TX (US)

(72) Inventors: Joshua E. Clapper, Downingtown, PA (US); Roy Dean, Schwenksville, PA (US); John R. Magargal, Souderton, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 562 days.

(21) Appl. No.: 15/398,115

(22) Filed: Jan. 4, 2017

(65) Prior Publication Data

US 2017/0198847 A1   Jul. 13, 2017

Related U.S. Application Data

(60) Provisional application No. 62/277,357, filed on Jan. 11, 2016.

(51) Int. Cl.
| | |
|---|---|
| *F16L 37/04* | (2006.01) |
| *F16L 37/08* | (2006.01) |
| *F16L 37/14* | (2006.01) |
| *F16L 21/03* | (2006.01) |
| *F16L 37/084* | (2006.01) |

(52) U.S. Cl.
CPC ............. *F16L 37/04* (2013.01); *F16L 21/03* (2013.01); *F16L 37/0845* (2013.01); *F16L 37/148* (2013.01)

(58) Field of Classification Search
CPC ....... F16L 37/04; F16L 21/03; F16L 37/0845; F16L 37/148; F16L 21/02; F16L 21/04; F16L 37/02; F16L 37/025; F16L 37/091; F16L 37/1235; F16L 47/08; F16L 47/47;
(Continued)

(56) References Cited

U.S. PATENT DOCUMENTS

| | | | | | |
|---|---|---|---|---|---|
| 4,674,756 | A | * | 6/1987 | Fallon | F16J 15/022 277/606 |
| 5,064,207 | A | * | 11/1991 | Bengtsson | F16L 17/032 285/231 |

(Continued)

FOREIGN PATENT DOCUMENTS

DE   102010032199 B3 * 12/2011   .............. F16L 21/03

*Primary Examiner* — Matthew Troutman
*Assistant Examiner* — William S. Choi
(74) *Attorney, Agent, or Firm* — Lempia Summerfield Katz LLC

(57) ABSTRACT

A pipe seal assembly includes a stiffener having an axis, an inner diameter (ID) and an outer diameter (OD). The seal assembly also includes an elastomer that is coupled to and extending though the stiffener, such that the elastomer is located on both the ID and the OD of the stiffener. A method of manufacturing a tubular member includes forming the tubular member with a female end; locating a seal assembly having an extension inside the female end, pressing the seal assembly into the female end to form a seal groove, belling the tubular member using the seal assembly to form a belled shape, and pressing the extension into the interior of the female end to form a spline groove inside the female end adjacent the seal groove; and then sacrificially removing the extension, but leaving the seal assembly to form a final assembly.

13 Claims, 8 Drawing Sheets

(58) Field of Classification Search
CPC ..... F16L 47/12; F16L 55/1645; F16L 17/035; F16J 15/02; F16J 15/10; F16J 15/12
USPC ..... 285/2, 3, 18, 27, 33, 304, 374, 117, 114, 285/115, 116, 339, 345, 399, 400, 260; 277/602, 603, 608, 609, 615, 616, 619
See application file for complete search history.

(56) References Cited

U.S. PATENT DOCUMENTS

| | | | |
|---|---|---|---|
| 5,599,028 A * | 2/1997 | Neumann | F16L 21/03 277/605 |
| 6,299,176 B1 | 10/2001 | Guzowski et al. | |
| 7,140,618 B2 * | 11/2006 | Valls, Jr. | F16L 21/03 285/110 |
| 7,207,606 B2 | 4/2007 | Owen et al. | |
| 7,513,536 B2 | 4/2009 | Corbett, Jr. et al. | |
| 2010/0059940 A1 | 3/2010 | Monteil | |
| 2010/0264645 A1 | 10/2010 | Jones et al. | |
| 2010/0289256 A1 * | 11/2010 | Shumard | F16L 21/03 285/331 |
| 2013/0113208 A1 | 5/2013 | Liao et al. | |

* cited by examiner

SYSTEM, METHOD AND APPARATUS FOR LOW PROFILE SEAL

This application claims priority to and the benefit of U.S. Prov. App. No. 62/277,357, filed Jan. 11, 2016, which is incorporated herein by reference in its entirety.

BACKGROUND OF THE INVENTION

Field of the Disclosure

The present invention relates in general to pipe seals and, in particular, to a system, method and apparatus for a low profile pipe seal.

Description of the Prior Art

Conventional spline-type, restrained pipe joint systems typically have splines and seals that are separate from and axially spaced-apart from the splines. The splines and seals can be lost during transportation or disassembly of the pipe joint systems. Examples of such designs include U.S. Pat. Nos. 5,662,360, 7,284,310, and 7,537,248. Some users would prefer a more reliable installation of restrained joint pipe that provides a robust, sealed pipe joint system. Thus, improvements in pipe restrained seals and joints continue to be of interest.

SUMMARY

Embodiments of a pipe seal assembly may include a stiffener formed from a polymer, annular in shape and having an axis, an inner diameter (ID) and an outer diameter (OD). The seal assembly also may include an elastomer that is annular in shape, coupled to and extending though the stiffener, such that the elastomer is located on both the ID and the OD of the stiffener.

Other embodiments may include a pipe system or pipe assembly. Such versions may include a polymer tubular member having an axis. A polymer pipe may be configured to be axially mounted inside the polymer tubular member. In addition, a seal assembly may be configured to be located between the polymer tubular member and the polymer pipe. The seal assembly may include a stiffener formed from a polymer, annular in shape and having a seal axis, an inner diameter (ID) and an outer diameter (OD). An elastomer that is annular in shape, may be coupled to and extend though the stiffener, such that the elastomer is located on both the ID and the OD of the stiffener.

In another embodiment, a method of manufacturing a tubular member may include forming the tubular member with a female end; locating a seal assembly having an extension inside the female end, pressing the seal assembly into an interior of the female end to form a seal groove, and belling the tubular member using the seal assembly to form a belled shape on an exterior of the female end, and pressing the extension into the interior of the female end to form a spline groove inside the female end adjacent the seal groove; and then sacrificially removing the extension, but leaving the seal assembly to form a final assembly.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for a low profile seal are disclosed. For example, as shown in FIGS. 1-4, a seal assembly 11 may include an inner diameter (ID) and an outer diameter (OD). Versions of the seal assembly 11 also may include a base or stiffener 13. Examples of the stiffener 13 may be formed from a polymer and be annular in shape. In some versions, the polymer may include at least one or polypropylene, high density polyethylene, acetal, nylon and flexible polyvinyl chloride. In other versions, the polymer may include at least one of the following reinforcements: glass, carbon, fibers, talc and a structural filler. In an example, the stiffener 13 can have a modulus of elasticity in a range of about 1E9 $N/m^2$ to about 4E9 $N/m^2$. Stiffener may include an axis 15, an inner diameter (ID) and an outer diameter (OD).

Embodiments of the seal assembly 11 also may include an elastomer 21. The elastomer 21 can be annular in shape, and coupled to and extending though the stiffener 13. Examples of the elastomer 21 can be located on both the ID ad the OD of the stiffener 13. The elastomer 21 may be coaxial with the axis 15 of the stiffener 13. In some versions, the elastomer 21 may include at least one of isoprene rubber (IR), styrene butadiene rubber (SBR), IR/SBR blend, nitrile, ethylene propylene diene monomer (EPDM) rubber and Viton. For some applications, such materials may satisfy the chemical compatibility requirements of ASTM standard F477. In an example, the elastomer 21 can have a hardness in a range of about 40 Shore A to about 80 Shore A.

Figure 1:
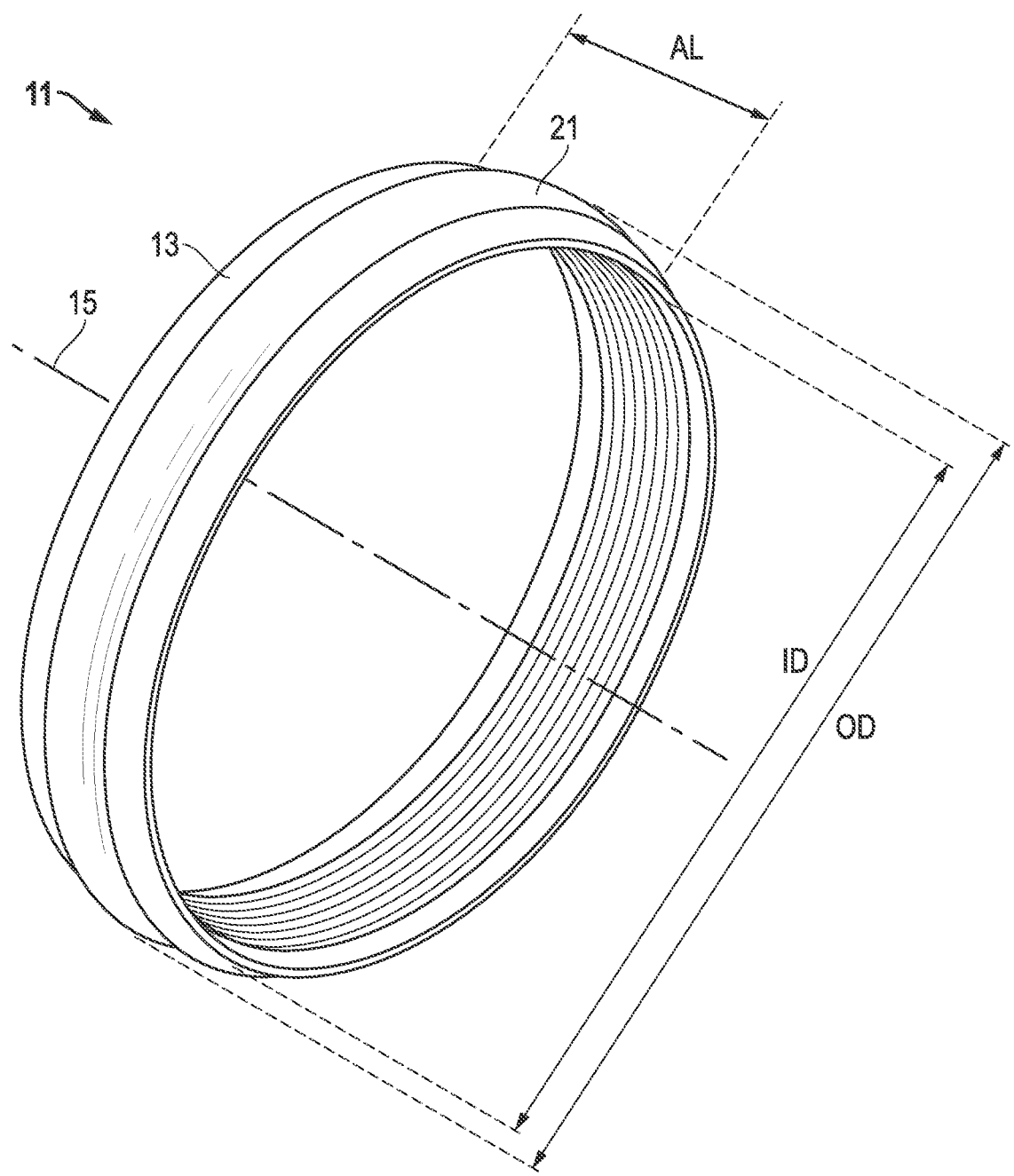
FIG. 1 is an isometric view of an embodiment of a seal assembly.
Figure 2:
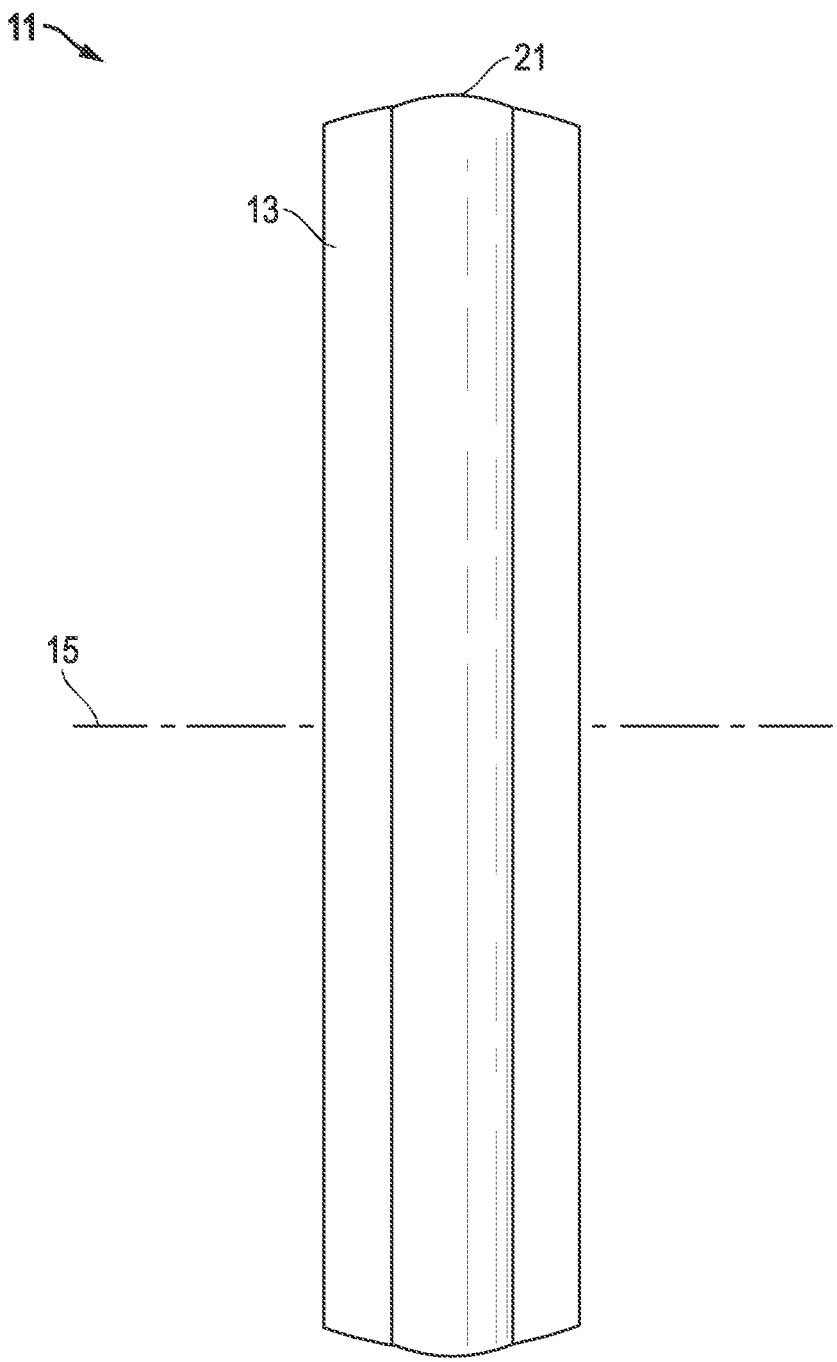
FIG. 2 is a side view of the seal assembly of FIG. 1.
Figure 3:
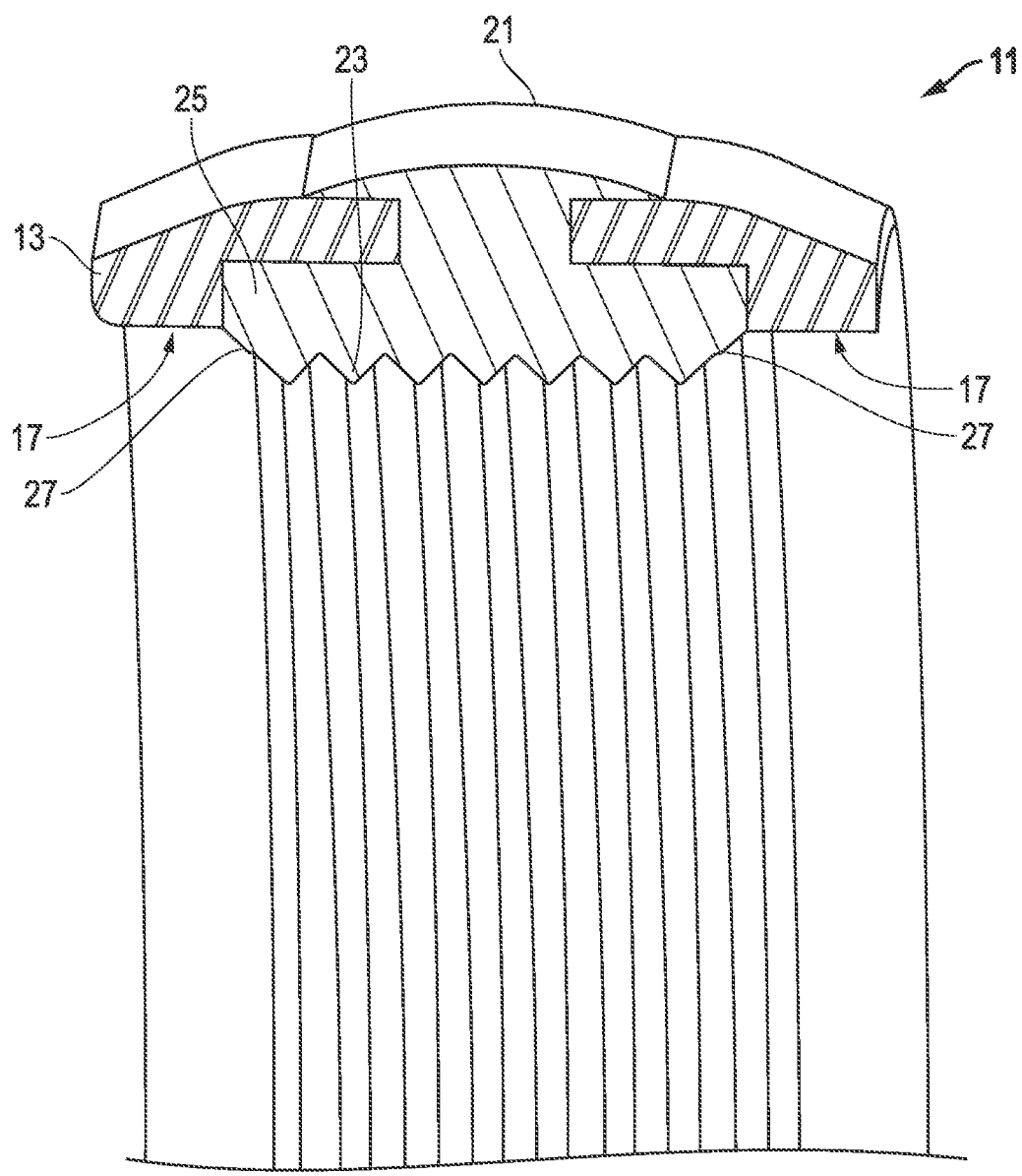
FIG. 3 is a sectional side view of a portion of the seal assembly of FIG. 1.
Figure 4:
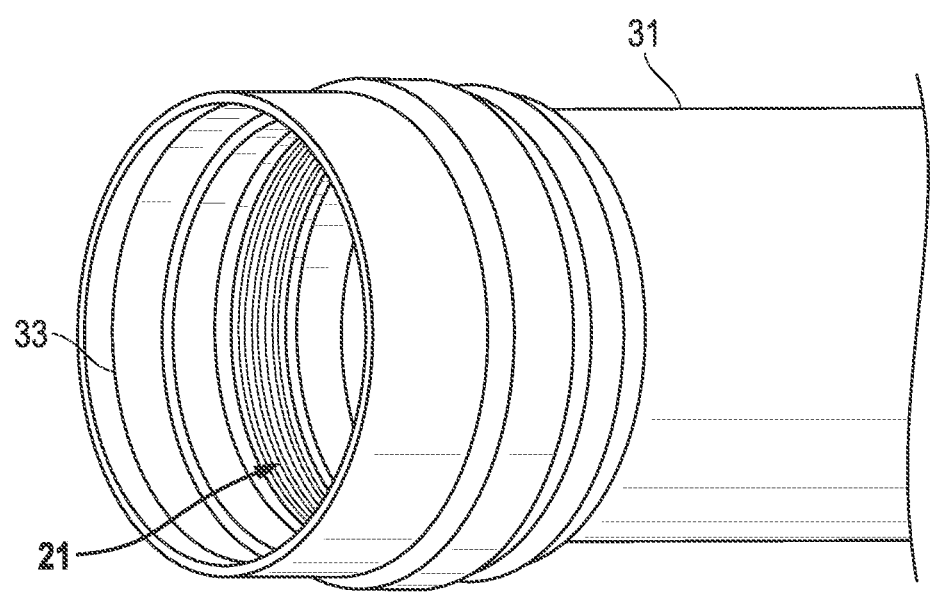
FIG. 4 is an isometric view of a tubular member with an embodiment of the seal assembly of FIG. 1 installed therein.
Figure 5:
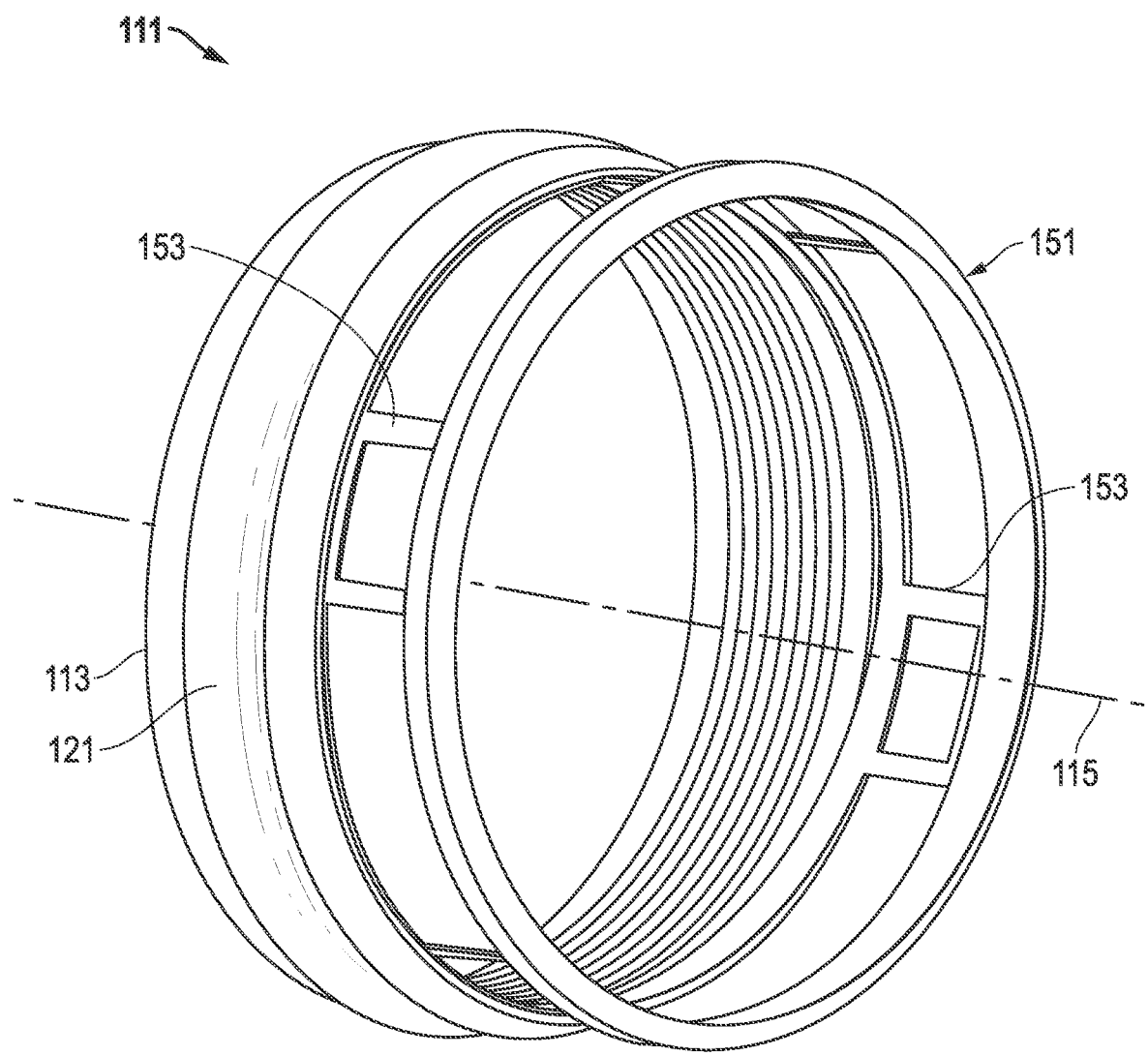
FIG. 5 is an isometric view of another embodiment of a seal assembly.

Embodiments of the seal assembly 11 are configured to be installed in an interior 33 of a polymer tubular member, such as a coupling or pipe 31 (FIG. 4). In addition, the installed seal assembly 211 also can form a seal with an exterior of a second polymer pipe 233 (FIG. 9) coupled to the coupling or pipe 231. In an example, when the seal assembly 211 is installed between the coupling or pipe 231 and the second polymer pipe 233, the seal assembly 11 may experience a compression ratio of sealing surfaces of about 10% to about 35%. In an example, compression ratio may be defined as a percentage of the seal assembly 211 that changes shape from uncompressed to compressed in operation after installation.

In some versions (FIG. 1), the seal assembly 11 may include a seal diameter (e.g., outer diameter, OD) that can be in a range of about 3 inches to about 48 inches, and a seal axial length AL (e.g., overall length) of about 0.125 inches to about 3 inches.

Embodiments of seal assembly 11 may include an OD profile with a dome shape (FIGS. 2 and 3) comprising both the stiffener 13 and the elastomer 31. In an example, a radius of curvature (ROC) of the stiffener 13 and a ROC of the elastomer 21 are substantially similar.

Embodiments of the elastomer 21 may include a plurality of ridges 23 (FIG. 3) on the ID. In some versions, the ridges 23 can be symmetrically spaced apart from axial ends of the seal assembly 11. Embodiments of the ridges 23 may be configured to have a compression ratio of about 10% to about 35% against a mating tubular member, such as a second polymer pipe. Example of the ridges 23 may protrude radially inward from a main body 25 of the elastomer in a range of about 0.1 inches to about 1 inch. In other examples, the ridges 23 may include at least one of triangular prisms, half ellipses, non-symmetric prisms, angled elements and kidney-shaped elements.

Versions of the seal assembly 11 may include the stiffener 13 having curved or planar surfaces 17 adjacent the ridges 23 on each axial side thereof. In another example, axial portions 27 of the elastomer 21 can taper from respective ones of the curved or planar surfaces 17 to the ridges 23, as shown. In some versions, only the stiffener 13 extends to the axial ends of the seal assembly 11, such that the elastomer 21 can be shorter in axial length than the stiffener 13. Thus, examples of the stiffener 13 may extend beyond both axial sides of the elastomer 21.

Embodiments of the seal assembly 11 may include at least one of the stiffener 13, the elastomer 21 and the seal assembly 11 being substantially symmetrical. In some examples, at least one of the stiffener 13, the elastomer 21 and the seal assembly 11 can be substantially symmetrical both axially and radially. Such designs can eliminate a need for orientation of the seal assembly 11 during assembly and installation in a tubular member.

Referring now to FIGS. 5-8, another embodiment of the seal assembly 111 may further comprise an extension 151. Versions of the extension 151 may protrude axially from the main portion of the seal assembly 111. Embodiments of seal assembly 111 may configured with any or all of the features of the embodiments of seal assembly 11, except that the reference numerals of seal assembly 111 may include an extra digit, such as axis 115 instead of axis 15 for seal assembly 11.

Figure 6:
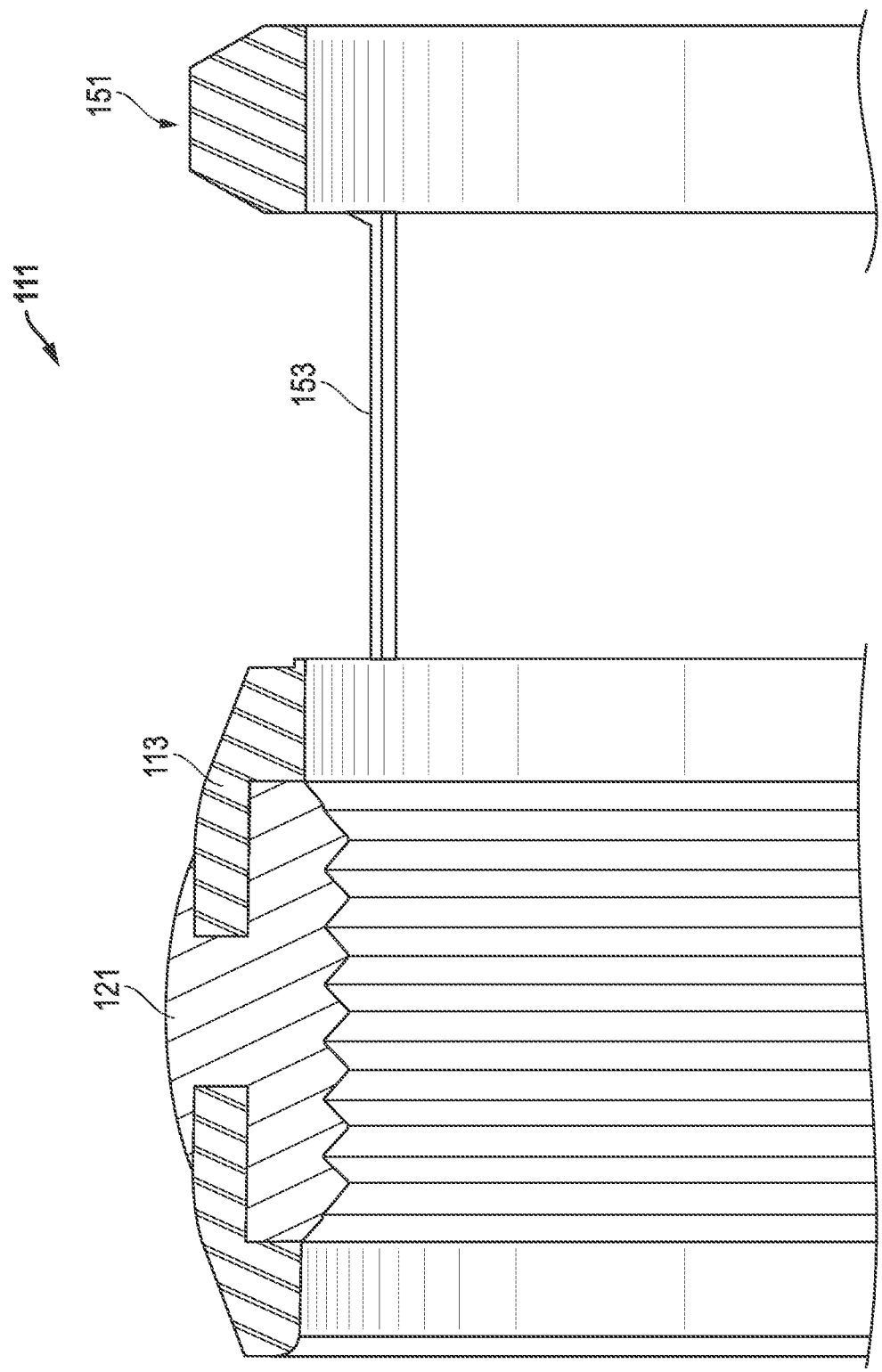
FIG. 6 is an enlarged, partial sectional side view of the seal assembly of FIG. 5
Figure 7:
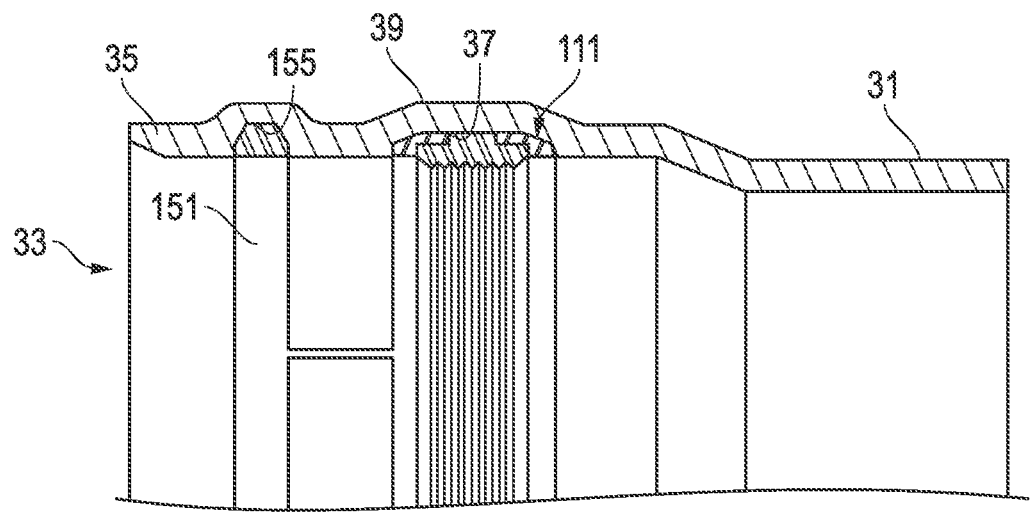
FIG. 7 is a partial sectional side view of an embodiment of the seal assembly of FIG. 5 installed in a tubular member.

In some versions, the extension 151 may extend directly from the stiffener 113, but not from the elastomer. Examples of the extension 151 may be formed from a same material as the stiffener 113. For example, the extension 151 may be molded with the stiffener 113. Versions of the extension 151 may comprise a variety of shapes, such as generally trapezoidal in radial sectional shape, as shown in FIG. 6. The extension 151 can protrude from only one axial end of the seal assembly 111. In an embodiment, the extension 151 may be joined to the seal assembly 111 with a plurality of ribs 153 that may be circumferentially spaced-apart. Extension 151 and ribs 153 can be sacrificial, such that they are discarded after use.

Embodiments of the seal assembly 111 may use the extension 151 sacrificially. For example, the extension 151 may be used to simulate a spline (FIG. 7) for a coupling or pipe 31. Versions of the extension 151 may be used to form a spline groove 155 in the coupling or pipe 31 during manufacturing of the coupling or pipe. In some examples, the extension 151 may be removed (compare FIGS. 7 and 8) from the coupling or pipe 31 after manufacturing and discarded, such that only the main portion of the seal assembly 111 remains in the coupling or pipe 31.

Figure 8:
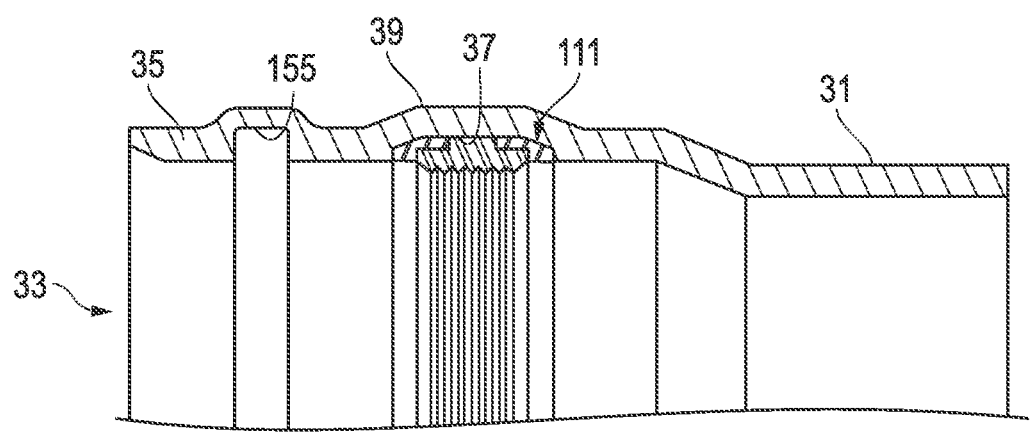
FIG. 8 is a partial sectional side view of the seal assembly and tubular member of FIG. 7, after further processing.

In still other embodiments, a method of manufacturing a tubular member 31 (FIGS. 7 and 8) are disclosed. For example, some versions of the method may include providing a seal assembly with a stiffener and an elastomer, and co-molding the elastomer to the stiffener. Embodiments of the method may include forming the tubular member 31 with a female end 35. The method may include locating a seal assembly 111 having an extension 151 inside the female end 35, pressing the seal assembly 111 into the interior 33 of the female end 35 to form a seal groove 37, and belling the tubular member 31 using the seal assembly 111 to form a belled shape 39 on an exterior of the female end 35. In addition, the extension 151 may be pressed into the interior 33 of the female end 35 to form a spline groove 155 inside the female end 35 adjacent the seal groove 37. The method also may include sacrificially removing the extension 151 (and, for example, the ribs 153), but leaving the main portion of the seal assembly 111 to form a final assembly (FIG. 8).

In some versions, the tubular member 31 may include a substantially consistent wall thickness in a radial direction on each axial side of the seal assembly 111, as well as over an axial range of the seal assembly 111. In one example, a wall thickness of the belled portion 39 of the polymer tubular member 31 is approximately equal to a wall thickness of an unbelled portion of the female end 35 of the polymer tubular member 31. In another example, the female end 35 of the tubular member 31 may include a wall thickness that is greater than a wall thickness of the tubular member 31 before belling. For example, the enhanced wall thickness of the female end 35 can be about 5% to about 20% thicker than the wall thickness of the tubular member 31 before belling. In another version, the enhanced wall thickness of the female end 35 can be axially located at and adjacent to only the belled shape 39.

Embodiments of the seal assembly 111 may include a compression ratio of about 10% to about 35%, over a range of pipe-to-pipe angular deflection of about 0% to about 3%. For example, about 0% to about 3% of pipe-to-pipe deflection (e.g., the angle formed between a central axis of a first pipe and a central axis of a second pipe, as measured at opposite pipe ends may be defined deflection or pipe flex.

In one version of the method, no cutting or machining of the female end 35 is required to form the final assembly. In another version of the method, neither the spline groove 155 nor the seal groove 37 requires machining operations after belling. In still another version, the spline groove 155 is machined to a final geometry after belling (compare the shape of spline groove 155 in FIGS. 7 and 8).

Figure 9:
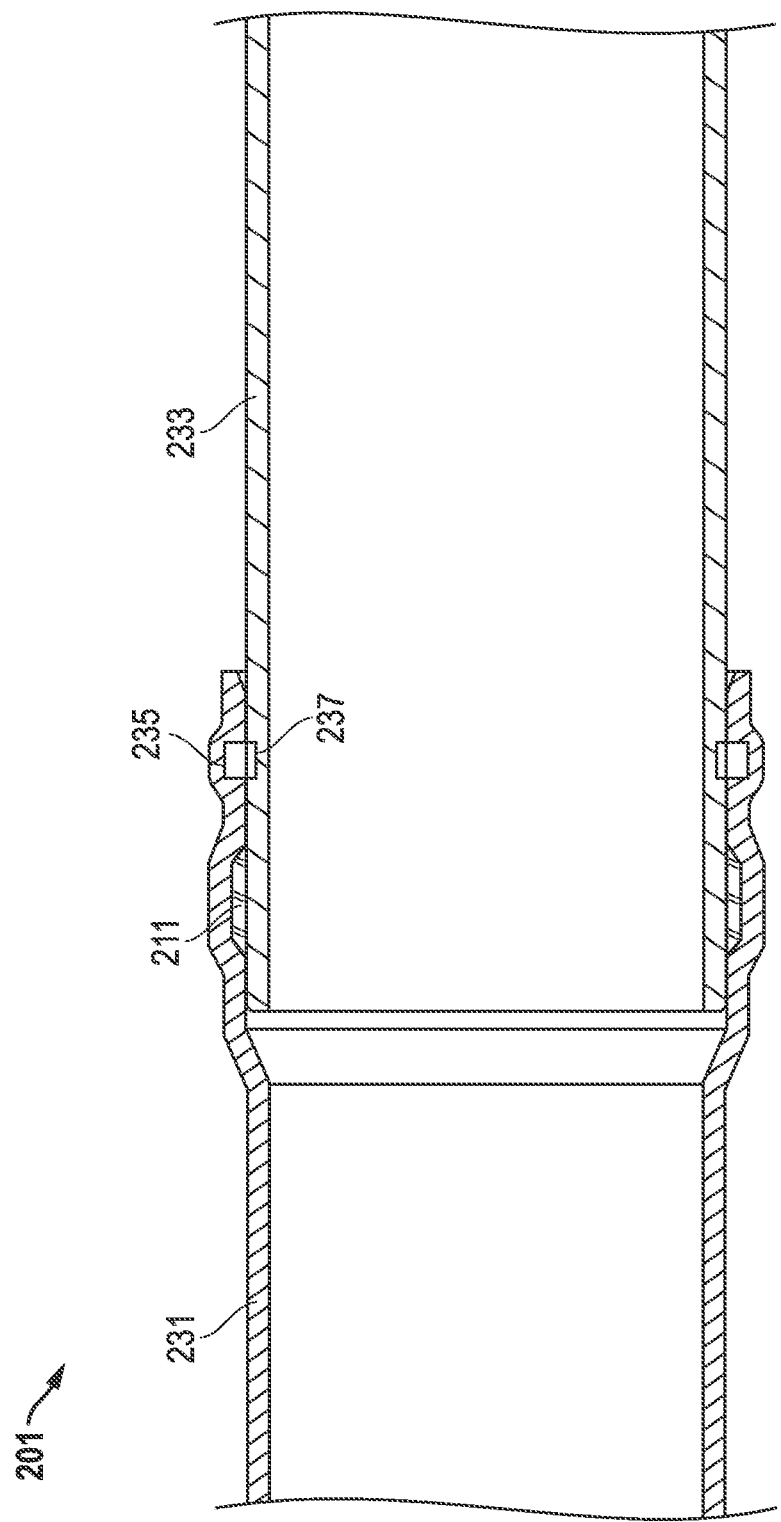
FIG. 9 is a sectional side view of a pipe assembly in accordance with an embodiment of the present disclosure.

Embodiments of the method may further comprise coupling the seal assembly 111 to a second pipe 233 (FIG. 9 shows seal assembly 211) with a mechanical restraint (e.g., a spline; not shown) in spline grooves 235, 237 to form a final assembly. Thus, the tubular member can be a restrained joint type of pipe or coupling. In some versions, the final assembly and second pipe may have a tensile strength in a range of about 5,000 lbs to about 250,000 lbs.

Alternative embodiments of the seal assembly may comprise an aspect ratio (AR) of axial length (AL) to radial height (RH). For example, the AR can be in a range of about 3.0 to about 5.0, without the extension. In another example, the AR is in a range of about 6.0 to about 9.0, with the extension. Embodiments of the stiffener also may comprise an aspect ratio (AR) of axial length (AL) to radial height (RH). Without the extension, the stiffener AR can be in a range of about 5.0 to about 7.0. With the extension, the stiffener AR can be in a range of about 10.0 to about 15.0. Embodiments of the elastomer may comprise an aspect ratio (AR) of axial length (AL) to radial height (RH), as well. The elastomer AR can be in a range of about 2.0 to about 3.0.

FIG. 9 depicts an embodiment of a pipe system and/or a pipe assembly 201. Pipe assembly 201 may be formed between a tubular member 231 (e.g., a belled pipe or coupling) and a pipe 233 axially mounted inside the tubular member 231. A seal assembly 231, such as any of the embodiments disclosed herein, may be located between the tubular member 231 and the pipe 233. Spline grooves 235, 237 may be formed in the tubular member 231 and pipe 233, respectively. For ease of illustration, no spline is shown in the spline grooves 235, 237.

Other versions of the present disclosure may comprise one or more of the following embodiments:

Embodiment 1

A seal assembly, comprising:
- a stiffener formed from a polymer, annular in shape and having an axis, an inner diameter (ID) and an outer diameter (OD); and
- an elastomer that is annular in shape, coupled to and extending though the stiffener, such that the elastomer is located on both the ID and the OD of the stiffener.

Embodiment 2

The seal assembly of any of these embodiments, wherein the seal assembly is configured to be installed inside a polymer tubular member and form a seal with an exterior of a polymer pipe.

Embodiment 3

The seal assembly of any of these embodiments, wherein the polymer tubular member is a coupling or a belled pipe.

Embodiment 4

The seal assembly of any of these embodiments, wherein the seal assembly is configured to be installed inside a bell of a polymer tubular member, and the bell of the polymer tubular member is formed by a heat forming and belling process.

Embodiment 5

The seal assembly of any of these embodiments, wherein a wall thickness of the bell is approximately equal to a wall thickness of an unbelled portion of the polymer tubular member.

Embodiment 6

The seal assembly of any of these embodiments, wherein the polymer comprises at least one of polypropylene, high density polyethylene, acetal, nylon and flexible polyvinyl chloride; and the polymer comprises at least one of the following reinforcements: glass, carbon, fibers, talc and a structural filler.

Embodiment 7

The seal assembly of any of these embodiments, wherein the elastomer comprises at least one of isoprene rubber (IR), styrene butadiene rubber (SBR), IR/SBR blend, nitrile, ethylene propylene diene monomer (EPDM) rubber and a synthetic rubber and fluoropolymer elastomer.

Embodiment 8

The seal assembly of any of these embodiments, wherein the seal assembly has a seal diameter in a range of about 3 inches to about 48 inches, and a seal axial length of about 0.125 inches to about 3 inches.

Embodiment 9

The seal assembly of any of these embodiments, wherein an exterior of the seal assembly comprises a dome-shaped radial profile, relative to the axis, comprising both the stiffener and the elastomer.

Embodiment 10

The seal assembly of any of these embodiments, wherein the seal assembly comprises a compression ratio of sealing surfaces defined as a percentage of the seal assembly that changes shape from an uncompressed configuration prior to installation, to a compressed configuration in operation, and the compression ratio is about 10% to about 35%.

Embodiment 11

The seal assembly of any of these embodiments, wherein each of the stiffener and the elastomer comprises a radius of curvature (ROC), and the stiffener ROC and the elastomer ROC are substantially similar.

Embodiment 12

The seal assembly of any of these embodiments, wherein the elastomer comprises a plurality of ridges on an interior thereof.

Embodiment 13

The seal assembly of any of these embodiments, wherein the ridges are symmetrically spaced apart from axial ends of the seal assembly.

Embodiment 14

The seal assembly of any of these embodiments, wherein each of the ridges is configured to have a compression ratio of about 10% to about 35% against a mating tubular member.

Embodiment 15

The seal assembly of any of these embodiments, wherein the ridges protrude radially inward from a body of the elastomer in a range of about 0.1 inches to about 1 inch.

Embodiment 16

The seal assembly of any of these embodiments, wherein the ridges comprise at least one of following radial shapes with respect to the axis: triangular prism, half ellipse, asymmetrical prism, angled element and kidney-shaped element.

Embodiment 17

The seal assembly of any of these embodiments, wherein the stiffener has planar or curved surfaces adjacent the ridges on each axial side thereof.

Embodiment 18

The seal assembly of any of these embodiments, wherein axial portions of the elastomer taper from respective ones of the planar surfaces to the ridges.

Embodiment 19

The seal assembly of any of these embodiments, wherein only the stiffener extends to axial ends of the seal assembly.

Embodiment 20

The seal assembly of any of these embodiments, wherein at least one of the stiffener, the elastomer and the seal assembly is substantially symmetrical both axially and radially.

Embodiment 21

The seal assembly of any of these embodiments, wherein the stiffener has a modulus of elasticity in a range of about 1E9 N/m2 to about 4E9 N/m2.

Embodiment 22

The seal assembly of any of these embodiments, wherein the elastomer has a hardness in a range of about 40 Shore A to about 80 Shore A.

Embodiment 23

The seal assembly of any of these embodiments, further comprising an extension protruding axially from the seal assembly.

Embodiment 24

The seal assembly of any of these embodiments, wherein the extension extends directly from the stiffener, but not from the elastomer.

Embodiment 25

The seal assembly of any of these embodiments, wherein the extension is formed from a same material as the stiffener.

Embodiment 26

The seal assembly of any of these embodiments, wherein the extension protrudes from only one axial end of the seal assembly.

Embodiment 27

The seal assembly of any of these embodiments, wherein the extension is sacrificial.

Embodiment 28

The seal assembly of any of these embodiments, wherein the extension is injection molded with the stiffener.

Embodiment 29

The seal assembly of any of these embodiments, wherein the extension simulates a spline for a pipe or coupling, and the extension is configured to form a spline groove in a pipe or coupling during manufacturing of the pipe or coupling.

Embodiment 30

The seal assembly of any of these embodiments, wherein the extension is removed from the pipe or coupling after manufacturing and discarded, and the seal assembly remains in the pipe or coupling.

Embodiment 31

The seal assembly of any of these embodiments, wherein the extension is joined to the seal assembly with a plurality of circumferentially spaced-apart ribs, which are sacrificial.

Embodiment 32

The seal assembly of any of these embodiments, wherein the extension is generally trapezoidal in radial sectional shape.

Embodiment 33

The seal assembly of any of these embodiments, wherein the stiffener extends beyond axial ends of the elastomer.

Embodiment 34

The seal assembly of any of these embodiments, wherein the seal assembly comprises an aspect ratio (AR) of axial length (AL) to radial height (RH), and the AR is in a range of about 3.0 to about 5.0.

Embodiment 35

The seal assembly of any of these embodiments, wherein the seal assembly comprises an aspect ratio (AR) of axial length (AL) to radial height (RH), and the AR is in a range of about 6.0 to about 9.0.

Embodiment 36

The seal assembly of any of these embodiments, wherein the stiffener comprises an aspect ratio (AR) of axial length (AL) to radial height (RH), and the AR is in a range of about 5.0 to about 7.0.

Embodiment 37

The seal assembly of any of these embodiments, wherein the stiffener comprises an aspect ratio (AR) of axial length (AL) to radial height (RH), and the AR is in a range of about 10.0 to about 15.0.

Embodiment 38

The seal assembly of any of these embodiments, wherein the elastomer comprises an aspect ratio (AR) of axial length (AL) to radial height (RH), and the AR is in a range of about 2.0 to about 3.0.

Embodiment 39

A pipe system, comprising:
a polymer tubular member having an axis;
a polymer pipe configured to be axially mounted inside the polymer tubular member; and
a seal assembly configured to be located between the polymer tubular member and the polymer pipe, the seal assembly comprising:
a stiffener formed from a polymer, annular in shape and having a seal axis, an inner diameter (ID) and an outer diameter (OD); and
an elastomer that is annular in shape, coupled to and extending though the stiffener, such that the elastomer is located on both the ID and the OD of the stiffener.

Embodiment 40

The pipe system of any of these embodiments, wherein the polymer tubular member comprises a coupling or a belled pipe.

Embodiment 41

A pipe assembly, comprising:
a polymer tubular member having an axis;
a polymer pipe axially mounted inside the polymer tubular member; and
a seal assembly located between the polymer tubular member and the polymer pipe, the seal assembly comprising:
a stiffener formed from a polymer, annular in shape and having a seal axis, an inner diameter (ID) and an outer diameter (OD); and
an elastomer that is annular in shape, coupled to and extending though the stiffener, such that the elastomer is located on both the ID and the OD of the stiffener.

Embodiment 42

The pipe assembly of any of these embodiments, wherein the polymer tubular member comprises a coupling or a belled pipe.

Embodiment 43

A method of manufacturing a tubular member, comprising:
(a) forming the tubular member with a female end;
(b) locating a seal assembly having an extension inside the female end, pressing the seal assembly into an interior of the female end to form a seal groove, and belling the tubular member using the seal assembly to form a belled shape on an exterior of the female end, and pressing the extension into the interior of the female end to form a spline groove inside the female end adjacent the seal groove; and then
(c) sacrificially removing the extension, but leaving the seal assembly to form a final assembly.

Embodiment 44

The method of any of these embodiments, wherein the tubular member has a substantially consistent wall thickness in a radial direction on each axial side of the seal assembly as well as over an axial range of the seal assembly.

Embodiment 45

The method of any of these embodiments, wherein the seal assembly provides a compression ratio of about 10% to about 35%, over a range of pipe-to-pipe angular deflection of about 0% to about 3%.

Embodiment 46

The method of any of these embodiments, wherein no cutting or machining of the female end is required to form the final assembly.

Embodiment 47

The method of any of these embodiments, wherein the seal assembly comprises a stiffener and an elastomer, and the method further comprises co-molding the elastomer to the stiffener.

Embodiment 48

The method of any of these embodiments, wherein, when the seal assembly is coupled to a second pipe with a mechanical restraint, the final assembly and second pipe have a tensile strength in a range of about 5,000 lbs to about 250,000 lbs.

Embodiment 49

The method of any of these embodiments, wherein the tubular member is a restrained joint type of pipe or coupling.

Embodiment 50

The method of any of these embodiments, wherein neither the spline groove nor the seal groove requires machining operations after belling.

Embodiment 51

The method of any of these embodiments, wherein the spline groove is machined to a final geometry after belling.

Embodiment 52

The method of any of these embodiments, wherein the female end of the tubular member has a wall thickness that is greater than a wall thickness of the tubular member before belling.

Embodiment 53

The method of any of these embodiments, wherein the wall thickness of the female end is about 5% to about 20% thicker than the wall thickness of the tubular member before belling.

Embodiment 54

The method of any of these embodiments, wherein the wall thickness of the female end is axially located adjacent to only the belled shape.

Embodiment 55

A seal assembly, comprising:
a stiffener formed from a polymer, annular in shape and having an axis, an inner diameter (ID) and an outer diameter (OD);
an elastomer that is annular in shape, coupled to the stiffener on both the ID and the OD of the stiffener; and
an extension protruding axially from the seal assembly.

Embodiment 56

The seal assembly of any of these embodiments, wherein the extension extends directly from the stiffener, but not from the elastomer.

Embodiment 57

The seal assembly of any of these embodiments, wherein the extension is formed from a same material as the stiffener.

Embodiment 58

The seal assembly of any of these embodiments, wherein the extension protrudes from only one axial end of the seal assembly.

Embodiment 59

The seal assembly of any of these embodiments, wherein the extension is configured to be sacrificial.

Embodiment 60

The seal assembly of any of these embodiments, wherein the extension is molded and integrally formed with the stiffener.

Embodiment 61

The seal assembly of any of these embodiments, wherein the extension simulates a spline for a pipe or coupling, and the extension is configured to form a spline groove in a pipe or coupling during manufacturing of the pipe or coupling.

Embodiment 62

The seal assembly of any of these embodiments, wherein the extension is configured to be removed from the pipe or coupling after manufacturing and discarded, and the seal assembly is configured to remain in the pipe or coupling.

Embodiment 63

The seal assembly of any of these embodiments, wherein the extension is joined to the seal assembly with a plurality of circumferentially spaced-apart ribs, which are configured to be sacrificial.

Embodiment 64

The seal assembly of any of these embodiments, wherein the extension is generally trapezoidal in radial sectional shape.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A seal assembly, comprising:
a stiffener formed from a polymer, annular in shape and having an axis, an inner diameter (ID) and an outer diameter (OD);
an elastomer that is annular in shape, coupled to and extending radially through the stiffener, such that the elastomer is located and exposed on both the ID and the OD of the stiffener; and a sacrificial extension that is annular in shape and connected to and axially spaced from the stiffener, wherein the sacrificial extension is configured to form a spline groove, axially spaced from the stiffener and the elastomer, in a pipe or coupling during manufacturing of the pipe or coupling, wherein the sacrificial extension is joined to the stiffener of the seal assembly with a sacrificial connection that extends axially between the stiffener and the sacrificial extension, and wherein the sacrificial connection is a plurality of axially extending and circumferentially spaced-apart ribs and a plurality of circumferentially spaced through holes.

2. The seal assembly of claim 1, wherein the seal assembly is configured to be installed inside a polymer tubular member and form a seal with an exterior of a polymer pipe.

3. The seal assembly of claim 1, wherein the seal assembly is configured to be installed inside a bell of a polymer tubular member, and the bell of the polymer tubular member is formed by a heat forming and belling process.

4. The seal assembly of claim 1, wherein a wall thickness of a belled portion of a polymer tubular member is approximately equal to a wall thickness of an unbelled portion of the polymer tubular member.

5. The seal assembly of claim 1, wherein the elastomer comprises at least one of isoprene rubber (IR), styrene butadiene rubber (SBR), IR/SBR blend, nitrile, ethylene propylene diene monomer (EPDM) rubber and a synthetic rubber and fluoropolymer elastomer.

6. The seal assembly of claim 1, wherein the seal assembly has a seal diameter in a range of about 3 inches to about 48 inches, and a seal axial length of about 0.125 inches to about 3 inches.

7. The seal assembly of claim 1, wherein the seal assembly comprises a compression ratio of sealing surfaces defined as a percentage of the seal assembly that changes shape from an uncompressed configuration prior to installation, to a compressed configuration in operation, and the compression ratio is about 10% to about 35%.

8. The seal assembly of claim 1, wherein the elastomer comprises ridges on an interior thereof.

9. The seal assembly of claim 8, wherein the ridges comprise at least one of following radial shapes with respect to the axis: triangular prism, half ellipse, asymmetrical prism, angled element and kidney-shaped element.

10. The seal assembly of claim 1, wherein the sacrificial extension is configured to be removable from the pipe or coupling after manufacturing and discarded, and the stiffener and the elastomer of the seal assembly remain in the pipe or coupling.

11. A seal assembly, comprising:
a stiffener formed from a polymer, annular in shape and having an axis, an inner diameter (ID) and an outer diameter (OD);
an elastomer that is annular in shape, coupled to the stiffener on both a surface of the ID and a surface of the OD of the stiffener; and
a sacrificial extension that is annular in shape and axially spaced from and connected to and made from the same material as the stiffener of the seal assembly,
wherein the sacrificial extension is joined to the stiffener of the seal assembly with a sacrificial connection that extends axially between the stiffener and the sacrificial extension, and
wherein the sacrificial connection is a plurality of axially extending and circumferentially spaced-apart ribs and a plurality of circumferentially spaced through holes.

12. The seal assembly of claim 11, wherein the sacrificial extension is configured to be removed from a pipe or coupling after manufacturing and discarded, and the stiffener and the elastomer of the seal assembly are configured to remain in the pipe or coupling.

13. A seal assembly, comprising:
a stiffener formed from a polymer, annular in shape and having an axis, an inner diameter (ID) and an outer diameter (OD);
an elastomer that is annular in shape, coupled to the stiffener on both a surface of the ID and a surface of the OD of the stiffener; and
a sacrificial extension that is annular in shape and axially spaced from and connected to and made from the same material as the stiffener of the seal assembly,
wherein the sacrificial extension is joined to the stiffener of the seal assembly with a plurality of axially extending and circumferentially spaced-apart ribs, which are configured to be sacrificial, and a plurality of circumferentially spaced through holes.

* * * * *